No. 752,124. PATENTED FEB. 16, 1904.
O. F. SWIFT.
APPLIANCE FOR SCRUBBING.
APPLICATION FILED MAY 27, 1903.
NO MODEL. 2 SHEETS—SHEET 1.
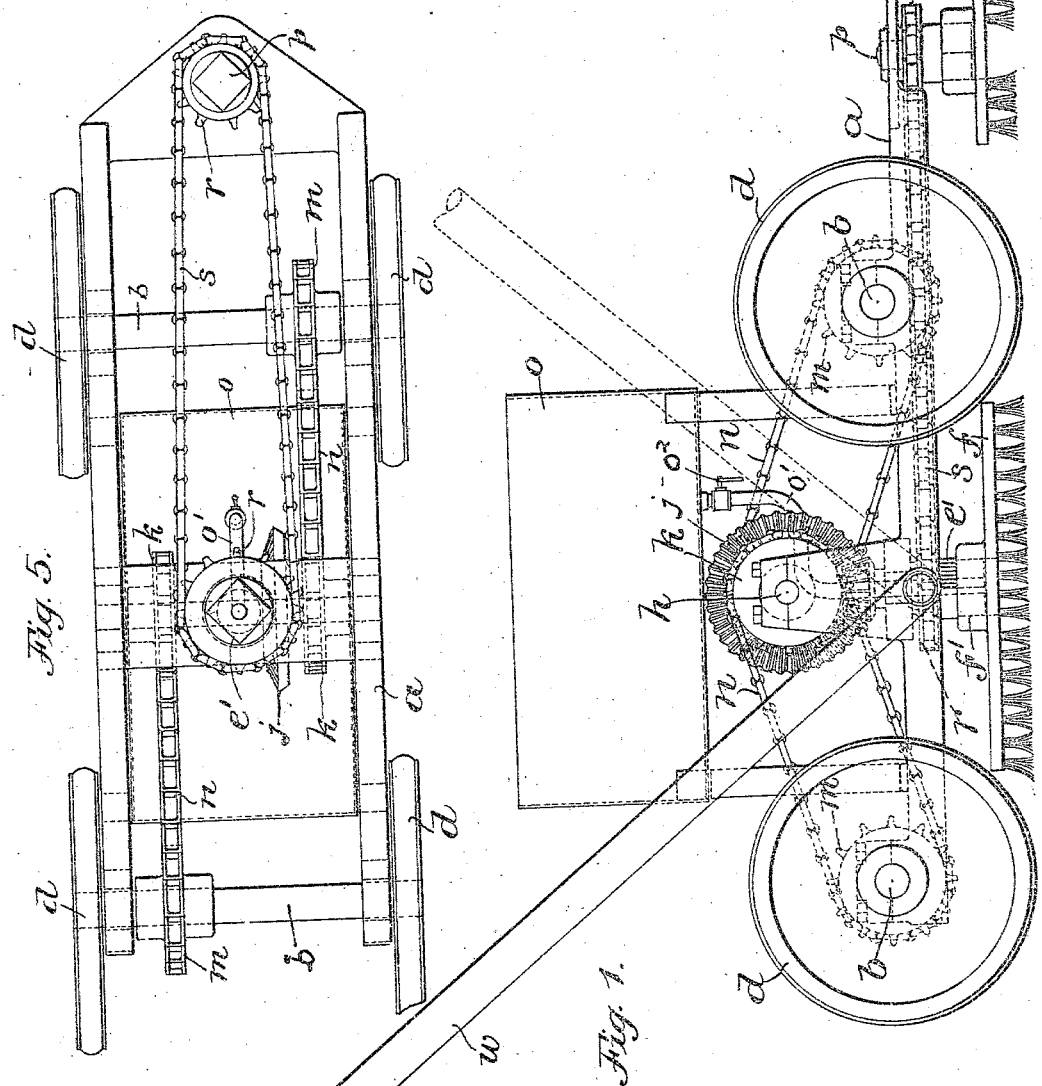
Witnesses:
H. L. Robbins
E. Batchelder
Inventor:
O. F. Swift
by Wright Brown & Quimby
Attys.

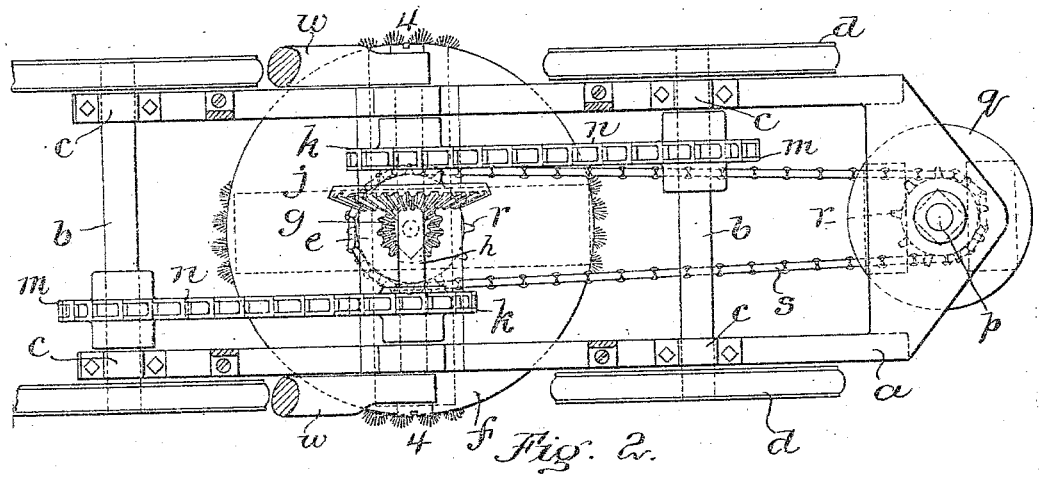
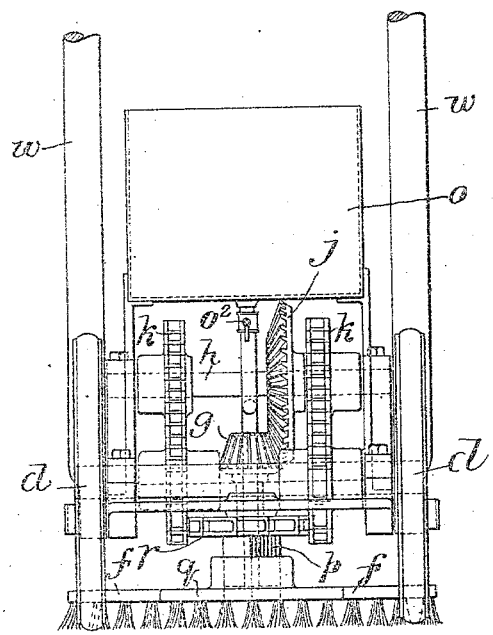
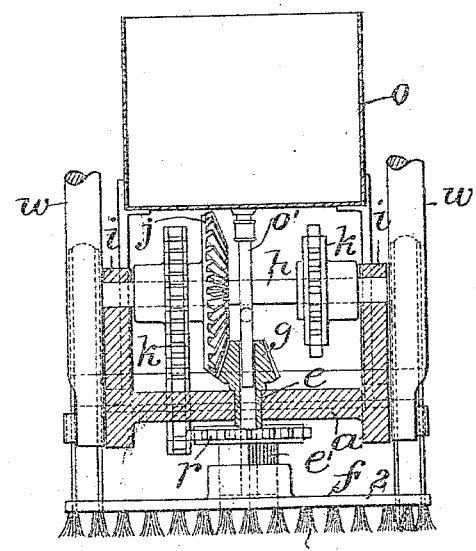
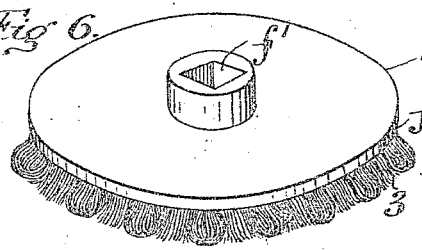

No. 752,124. Patented February 16, 1904.

UNITED STATES PATENT OFFICE.

ORIN F. SWIFT, OF QUINCY, MASSACHUSETTS.

APPLIANCE FOR SCRUBBING.

SPECIFICATION forming part of Letters Patent No. 752,124, dated February 16, 1904.

Application filed May 27, 1903. Serial No. 158,998. (No model.)

*To all whom it may concern:*

Be it known that I, ORIN F. SWIFT, of Quincy, in the county of Norfolk and State of Massachusetts, have invented certain new and useful Improvements in Appliances for Scrubbing, of which the following is a specification.

This invention has for its object to provide a machine adapted to scrub or brush a floor or other surface or to perform analogous operations, such as sandpapering, mopping, polishing, oiling, &c.

The invention consists in the improved machine hereinafter described and claimed, the same embodying a frame, axles journaled in bearings on the frame, traction-wheels affixed to the axles and arranged to run upon a floor and to support the frame at a suitable distance above the floor, a vertical shaft journaled in the frame and extending below the latter, a rotary member, such as a scrubbing-brush, affixed to the lower portion of the shaft and arranged to bear upon the floor, and connections between the vertical shaft and the axles, whereby when the axles are rotated rotary motion will be communicated from them to the shaft, which will in turn rotate the brush and cause the latter to act upon the floor.

Of the accompanying drawings, forming a part of this specification, Figure 1 represents a side elevation of a machine embodying my invention. Fig. 2 represents a top plan view of the same, omitting the tank. Fig. 3 represents an end elevation. Fig. 4 represents a section on line 4 4 of Fig. 2. Fig. 5 represents a bottom plan view or a view of the machine inverted, the brush being removed. Fig. 6 represents a perspective view of the brush.

The same reference characters indicate the same parts in all the figures.

In the drawings, $a$ represents the frame, which may be of any suitable form and construction.

$b\ b$ represent axles which are journaled to rotate in perpendicular arms forming bearings $c$, affixed to the frame, and are provided with traction-wheels $d$, which are rigidly affixed to the axles and are preferably provided with elastic tires. The wheels are arranged to support the frame $a$ at a considerable distance above the floor, as indicated in Figs. 1, 3, and 4.

$e$ represents a vertical shaft journaled in bearings on the frame $a$ between the axles $b\ b$. The lower portion $e'$ of the shaft is enlarged and squared to enter a squared socket $f''$, affixed to the back of a rotary member $f$, which is here shown as a scrubbing-brush comprising a rigid back 2, to which the socket $f''$ is affixed, and bristles or brush material 3, projecting downwardly from said back. To the upper end portion of the shaft $e$ is fixed a bevel-gear $g$.

$h$ represents a horizontal shaft journaled in perpendicular arms forming elevated bearings $i\ i$ on the frame $a$ and located above the vertical shaft $e$. To the shaft $h$ is affixed a bevel-gear $j$, meshing with the gear $g$.

$k\ k$ represent sprocket-wheels affixed to the shaft $h$ at opposite sides of the gear $j$.

$m\ m$ represent sprocket-wheels affixed to the axles $b\ b$, one of the wheels $m$ being in alinement with one of the wheels $k$, while the other wheel $m$ is in alinement with the other wheel $k$.

$n\ n$ represent sprocket-chains connecting the wheels $m\ m$ with the wheels $k\ k$.

It will be seen that the mechanism above described imparts rotary motion from the axles $b$ to the vertical shaft $e$ and brush $f$ whenever the axles are rotated by the movement of the traction-wheels $d$ upon the floor. The brush is thus caused to act upon or scrub the floor.

$o$ represents a tank which is mounted upon elevated supports on the frame and is provided with an outlet-pipe $o'$, which communicates with the interior of the vertical shaft $e$, the latter being tubular. The outlet $o'$ is provided with a cock $o^2$. When it is desired to supply water to the brush, the cock is opened, and water flows from the tank through the center of the brush to the surface on which the brush is acting. The squared portion $e'$ of the vertical shaft $e$ and the socket portion $f'$ of the brush $f$ enable the brush to be readily applied to and removed from the machine. Preferably the socket is loosely mounted on the portion $e'$ of the shaft and free from positive engagement therewith, so that when the frame is raised or tilted the brush will drop from the shaft $e$. This construction provides for the use of interchangeable members, so that the same machine may be used with a scrubbing-brush, a mop, an abrading scouring-tool, such as a disk coated with sandpaper or emery or a disk made wholly or in part of stone. The described construction also compensates for wear of the acting portion of the rubbing device, such as the brush material 3, the brush as a whole gravitating downward to take up wear of the brush material.

$p$ represents a vertical shaft journaled in a bearing carried by a forwardly-projecting portion of the frame $a$, and $q$ represents a rotary member engaged with the shaft $p$ in the same manner that the member $f$ is engaged with the shaft $e$, the member $q$ being of the same nature as the member $f$, and being in advance of the front wheels it is enabled to act upon the floor at the angle formed by the floor and mop-board. Each of the shafts $e$ and $p$ is provided with a sprocket-wheel $r$, and said sprocket-wheels are connected by a sprocket-chain $s$. Said sprocket wheels and chain impart rotary motion from the shaft $e$ to the shaft $p$.

$w$ $w$ represent hand-levers jointed to the sides of the frame $a$ and connected by a cross-bar $w'$. The hand-levers are pivoted intermediate of the traction-wheels, which latter serve as rests for said handles when the machine is not in use.

I claim—

An appliance of the character specified comprising a frame, rotary axles journaled therein, traction-wheels fixed to said axles, a main drive-shaft, means whereby said shaft is rotated by said traction-wheels, a vertical shaft centrally mounted in said frame and geared with said drive-shaft, a second rotary shaft vertically mounted in a forwardly-projecting portion of said frame and geared to said former vertical shaft, and acting members mounted on said vertical shafts.

In testimony whereof I have affixed my signature in presence of two witnesses.

ORIN F. SWIFT.

Witnesses:
GRACE R. STANCOMBE,
CHARLES H. JOHNSON.